United States Patent
Bertolotti et al.

(10) Patent No.: US 9,018,788 B2
(45) Date of Patent: Apr. 28, 2015

(54) WIND SENSOR SYSTEM USING BLADE SIGNALS

(75) Inventors: Fabio Bertolotti, Bad Bentheim (DE); Jens Van Schelve, Gronau (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 273 days.

(21) Appl. No.: 13/504,640

(22) PCT Filed: Oct. 23, 2010

(86) PCT No.: PCT/EP2010/066008
§ 371 (c)(1),
(2), (4) Date: Apr. 27, 2012

(87) PCT Pub. No.: WO2011/051194
PCT Pub. Date: May 5, 2011

(65) Prior Publication Data
US 2012/0211986 A1    Aug. 23, 2012

(30) Foreign Application Priority Data
Oct. 28, 2009 (EP) .................................... 09013565

(51) Int. Cl.
*F02D 9/00* (2006.01)
*F03D 11/00* (2006.01)
*F03D 7/04* (2006.01)

(52) U.S. Cl.
CPC ............ *F03D 11/0091* (2013.01); *F03D 7/042* (2013.01); *F05B 2240/221* (2013.01);
(Continued)

(58) Field of Classification Search
USPC ................................................... 290/44, 55
See application file for complete search history.

(56) References Cited

U.S. PATENT DOCUMENTS 7,317,260 B2    1/2008   Wilson
7,445,431 B2   11/2008   Larsen et al.
(Continued)

FOREIGN PATENT DOCUMENTS

| DE | 19832207 A1 | 1/2000 |
| DE | 102006041461 A1 | 3/2008 |
| EP | 1361445 A1 | 11/2003 |
| EP | 2017468 A1 | 1/2009 |

(Continued)

OTHER PUBLICATIONS

G. Bir, "Multiblade Coordinate Transformation and Its Application to Wind Turbine Analysis", National Renewal Energy Laboratory, NREL/CP-500-42553, Jan. 2008.

(Continued)

*Primary Examiner* — Tho D Ta
(74) *Attorney, Agent, or Firm* — Harness, Dickey & Pierce, P.L.C.

(57) ABSTRACT

The present invention relates to a wind-velocity-field measurement system for use in a wind turbine having a rotor with' two or more blades, comprising at least one sensor-signal obtained by measuring a physical quantity on at angle least one of the blades, the physical quantity being indicative of at least one wind-velocity-field characteristic; a table (140, 142, 144) build for a plurality of wind conditions by associating values characterizing the at least one sensor-signal with values of the at least one wind-velocity-field characteristic, and; searching means (150, 152, 154) for determining from the table a value of the at least one wind-velocity-field characteristic for a current wind condition given values characterizing the at least one sensor-signal.

17 Claims, 8 Drawing Sheets

(52) U.S. Cl.
CPC ....... *F05B2260/821* (2013.01); *F05B 2270/32* (2013.01); *F05B 2270/708* (2013.01); *F05B 2270/802* (2013.01); *F05B 2270/808* (2013.01); *Y02E 10/722* (2013.01); *Y02E 10/723* (2013.01)

(56) References Cited

U.S. PATENT DOCUMENTS

| | | | |
|---|---|---|---|
| 8,192,161 B2 * | 6/2012 | Baker et al. | ............... 416/23 |
| 2007/0086893 A1 | 4/2007 | Pedersen | |

FOREIGN PATENT DOCUMENTS

| | | |
|---|---|---|
| EP | 2048507 A2 | 4/2009 |
| GB | 2067247 A | 7/1981 |

OTHER PUBLICATIONS

International Search Report and Written Opinion for PCT/EP2010/066008, mailed Mar. 8, 2011; ISA/EP.

International Preliminary Report on Patentability (Chapter I of the Patent Cooperation Treaty) for PCT/EP2010/066008, issued May 1, 2012.

* cited by examiner

WIND SENSOR SYSTEM USING BLADE SIGNALS

CROSS-REFERENCE TO RELATED APPLICATIONS

This application is a 371 U.S. National Stage of International Application No. PCT/EP2010/066008, filed Oct. 23, 2010, and claims priority to European Patent Application No. 09013565.8, filed Oct. 28, 2009, the disclosures of which are herein incorporated by reference in their entirety.

PRIOR ART

Modern wind turbines almost exclusively use blades that are pitchable about their longitudinal axis to regulate the blades' angle of attack, hence the blades' lift and drag forces. Collective pitch motion between all blades attached to the rotor is used for regulation of aerodynamic power extracted from the wind, while individual pitch control is mainly used to alleviate or reduce loads experienced by the blades during normal operation in non-steady wind conditions.

For effective individual pitch control, essentially instantaneous knowledge of the wind velocity field over the rotor swept area is needed. Wind velocity field characteristics of particular importance are wind speed, wind direction, horizontal wind shear, and vertical wind shear. These characteristics are most suitable for control when they are spatially averaged over the rotor swept area, yet essentially all turbines commercially sold today use a single (spatial) point measurement provided by one wind anemometer and one wind vane, both located on the nacelle and downstream from the rotor blades. Their output provides no information on wind shear, and a spatially incomplete description of wind speed and wind direction. As a consequence, these measured values of speed and direction are often substantially different from the preferred spatially averaged values over the rotor swept area due to the passage over the anemometer and vane of turbulent eddies in the wind velocity field. Furthermore, being located downstream from the rotor, both anemometer and vane are subjected to the periodic passage of the blade's turbulent wake. To remove the wake's unwanted influence on the measurements, the signal of the anemometer and vane must be averaged over a long time period, but doing so also removes from the signals the required time resolution.

Patent applications EP 2048507 A2 and US 2007/0086893 A1 both present an anemometer system located in front of, and essentially concentric with, the hub. The anemometer can measure two or more velocity components simultaneously. The issues with single-spatial-point measurement are still present; the main advantage claimed is the ability to measure wind conditions in front of the turbulent wakes created by each blade. While the wake from each blade does indeed convect downstream, the aerodynamic influence of the blades extends in a strong fashion also upstream of the rotor plane, as evident by the rotor induced velocity, as is well known in the art. Consequently, the true wind speed is not directly measured, and a correction based on the instantaneous power extracted by the blades is again needed. This correction is difficult to measure or quantify, as mentioned above.

In U.S. Pat. No. 7,317,260, a method for identifying a combination of wind speed and wind direction based on tower deformation is described. A less complete description is also found in EP 1361445 A1. The claimed method uses the deformation of the tower supporting the wind-turbine, together with the rotor speed, blade pitch angle, and generator torque, to deduce a combination of wind speed and wind direction. However, the wind speed and wind direction cannot be individually estimated without additional measurements or assumptions. Horizontal and vertical wind shears are not detectable. Thus, the claimed method does not provide the desired wind-velocity field quantities, as described above.

A further complicating factor in the method of operation claimed in EP 1 361 445 A1, and found in numerous theories of control, is the use, within the mathematical process used to translate the sensed quantities into the desired values, of one or more "governing" equations, e.g. describing the dynamics of the wind turbine or a component thereof. While the aeroelastic equations of motion of a wind turbine, or a component thereof, can be written explicitly, the forces appearing within these equations often cannot be. Examples include "non-linear" forces due to friction in bearings, as well as aerodynamic forces that depend on the instantaneous aerodynamic state of the rotor blades. These states are not known or easily measured, due to the effects of turbulence both near and far from the blades' surface, as well as the roughness condition of the blade's surface itself.

In U.S. Pat. No. 7,445,431 B2 a method for measuring local blade flow is described. The method employs devices to measure the flow properties either at the surface of each rotor blade, or in the immediate vicinity. The wind field is deduced from the flow properties by subtracting the rotor velocity and estimating the rotor induced velocity. As mentioned above, the estimation of the induced velocity rests on knowledge of the instantaneous aerodynamic state of the rotor blades, which is difficult to measure. Additionally, the apparent wind velocity over a blade is nearly equal to the rotor velocity, since this later value is typically seven times larger than the undisturbed wind velocity. Therefore, the subtraction of the rotor speed from the apparent speed makes the resulting quantity sensitive to noise and prone to excessive error. Lastly, the outboard location of the sensors makes the sensors difficult to maintain, replace, or service, as well as prone to lightning strikes, dirt build-up, and other atmospheric effects.

Ultrasonic (SODAR) or radar based wind-sensing systems are routinely used in the windenergy industry to provide multi-point wind measurements, typically during evaluation of the wind potential at a site. The measurements are often made along a line, hence do not cover the swept area of the rotor. More importantly, SODAR and LIDAR systems are too expensive for use in commercial wind turbines (i.e. beyond the prototype stage).

It is, thus, desirable to have a system for measuring the wind velocity field over the swept area of a wind turbine rotor that is free of the aforementioned limitations.

OBJECTIVES OF THE INVENTION

An objective of the current invention is a wind measuring system that provides
1. wind speed, direction, x-shear, y-shear, and other wind-field states,
2. sampling of the wind-state over the entire rotor-swept area,
3. near instantaneous sampling rate,
4. independence from both assumptions and incomplete models of physical quantities,
5. good serviceability and easy maintenance,
6. low cost.

DETAILED DESCRIPTION

The invention can be applied to a rotor with two or more blades, including rotors having three blades attached to the rotor through a pitch bearing.

Wind Velocity Field Characteristics

The wind velocity field characteristics used in this invention are wind velocity values spatially averaged over the rotor swept area. Since the average is in space only, the time variation of the data is not affected.

Figure 1:
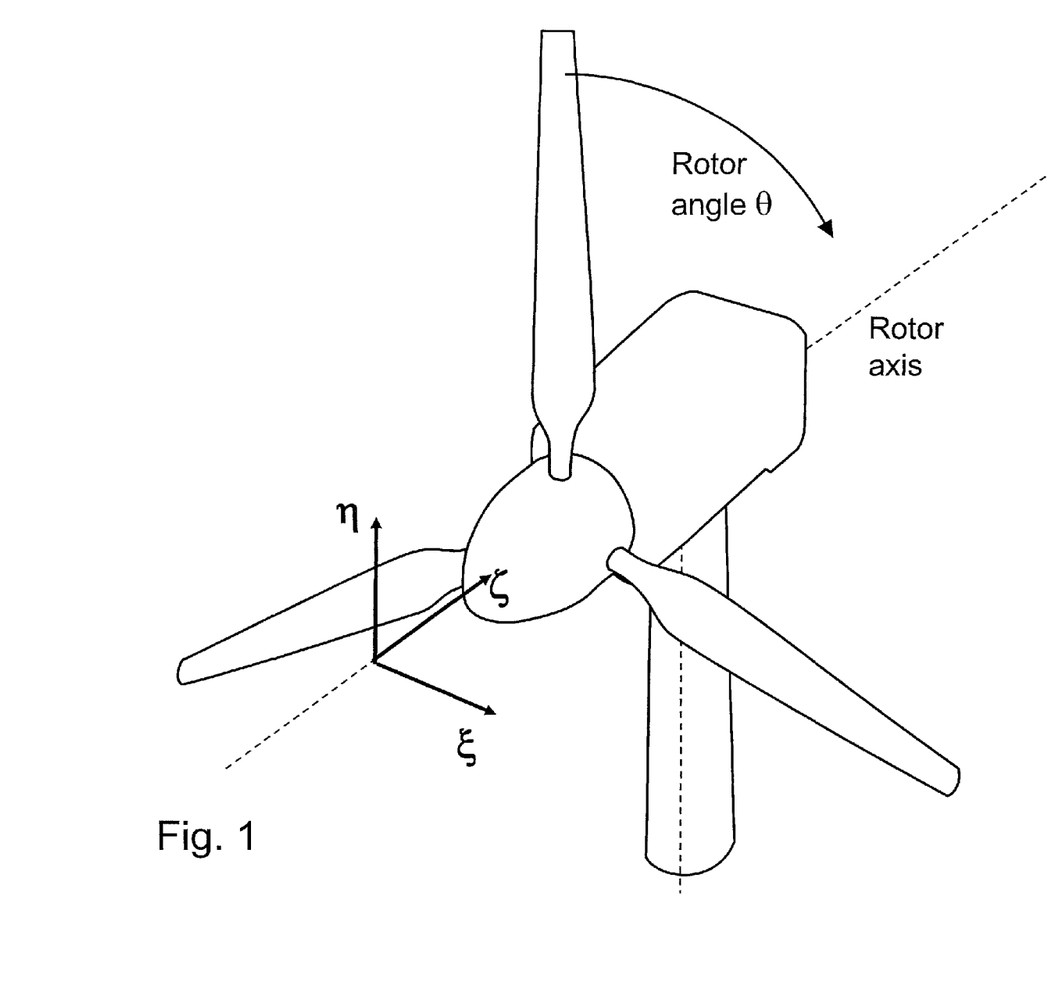
FIG. 1 is a high-level perspective drawing of a rotor of a wind turbine, and particularly denoting a coordinate system with coordinates that are fixed relative to a nacelle of the wind turbine.

In the following description, use is made of a coordinate system, with coordinates $\xi$, $\eta$, $\zeta$, that is non-rotating, hence fixed with the nacelle. See FIG. 1. The $\zeta$ coordinate is pointing along the axis of rotation of the rotor, denoted by the unit vector n. (Bold letters denotes vectors, as is customary in the art). The coordinate $\eta$ points vertically up, and the axis $\xi$ completes the orthogonal coordinate system by pointing in the horizontal direction.

A first wind velocity field characteristic is the mean wind velocity:

$$V_m(t) = \frac{1}{A} \int\int V(t) dA \quad (1)$$

where A is the rotor swept area, t is the time, and V(t) is the value of the wind velocity field at the rotor swept area at time t. For simplicity in exposition, we will suppress the explicit notation "(t)" showing time dependency of the variables.

The mean wind velocity $V_m$ has components $V_1$, $V_2$ and $V_3$ along the $\xi$, $\eta$, $\zeta$ directions, respectively, and from these components the wind direction in the horizontal plane (i.e. the plane spanned by the axes $\xi$ and $\zeta$) can be directly computed:

$$\chi = a\tan(V_1/V_3) \quad (2)$$

This angle measures the deviation of the wind direction from the rotor axis. This angle is often referred to as "yaw error" in the literature, and is usually desirable to control the turbine so as to minimize its value.

A second wind velocity field characteristic is the first horizontal moment of the wind velocity field:

$$\psi_1 = \frac{1}{A} \int\int \frac{V \cdot n - V_3}{V_3} \left(\frac{\xi}{D}\right) dA. \quad (3)$$

where D is the rotor diameter, and where $\xi$ measured from the axis of rotation. The quantity $\psi_1$ is proportional to the linear wind shear in the horizontal plane.

A third wind velocity field characteristic is the first vertical moment of the wind velocity field:

$$\phi_1 = \frac{1}{A} \int\int \frac{V \cdot n - V_3}{V_3} \left(\frac{\eta}{D}\right) dA. \quad (4)$$

where $\eta$ is measured from the axis of rotation. The quantity $\phi_1$ is proportional to the linear wind shear in the vertical plane.

Higher-order moments provide additional wind velocity field characteristics. The second horizontal moment is $$\psi_2 = \frac{1}{A} \int\int \frac{V \cdot n - V_3}{V_3} \left(\frac{\xi}{D}\right)^2 dA. \quad (5)$$

and the second vertical moment is $$\phi_2 = \frac{1}{A} \int\int \frac{V \cdot n - V_3}{V_3} \left(\frac{\eta}{D}\right)^2 dA. \quad (6)$$

The Wind-Velocity-Field Measuring System

The wind-velocity-field measuring system comprises sensors located in, within, on, or otherwise attached to, the blades and rotor hub. These sensors produce sensor-signals dependent on wind velocity field characteristics.

The wind-velocity-field measuring system uses at least one sensor-signal responsive to at least one wind velocity field characteristic. In the preferred embodiment, this sensor-signal is either proportional to the blade strain or blade deflection, measured at a predetermined location along the blade. Air pressure or air velocity measurements at predetermined blade surface locations can also be used, but are not preferred due to their susceptible to fouling and clogging.

Strain can be measured, for example, by surface mounted or embedded optical fibers or electrical strain gauges in the blades, or from strain measurements of the bolts attaching the blade to the pitch bearing. The blade twisting moment can be calculated, for example, by measuring the moment exerted by the pitch-control-system, well known in the art, to hold the blade at constant angular position. Blade deformation measurements can be made, for example, by optical systems inside each blade. The blade bending moments can be deduced from blade strain measurements and the known geometry of the blade.

Figure 2:
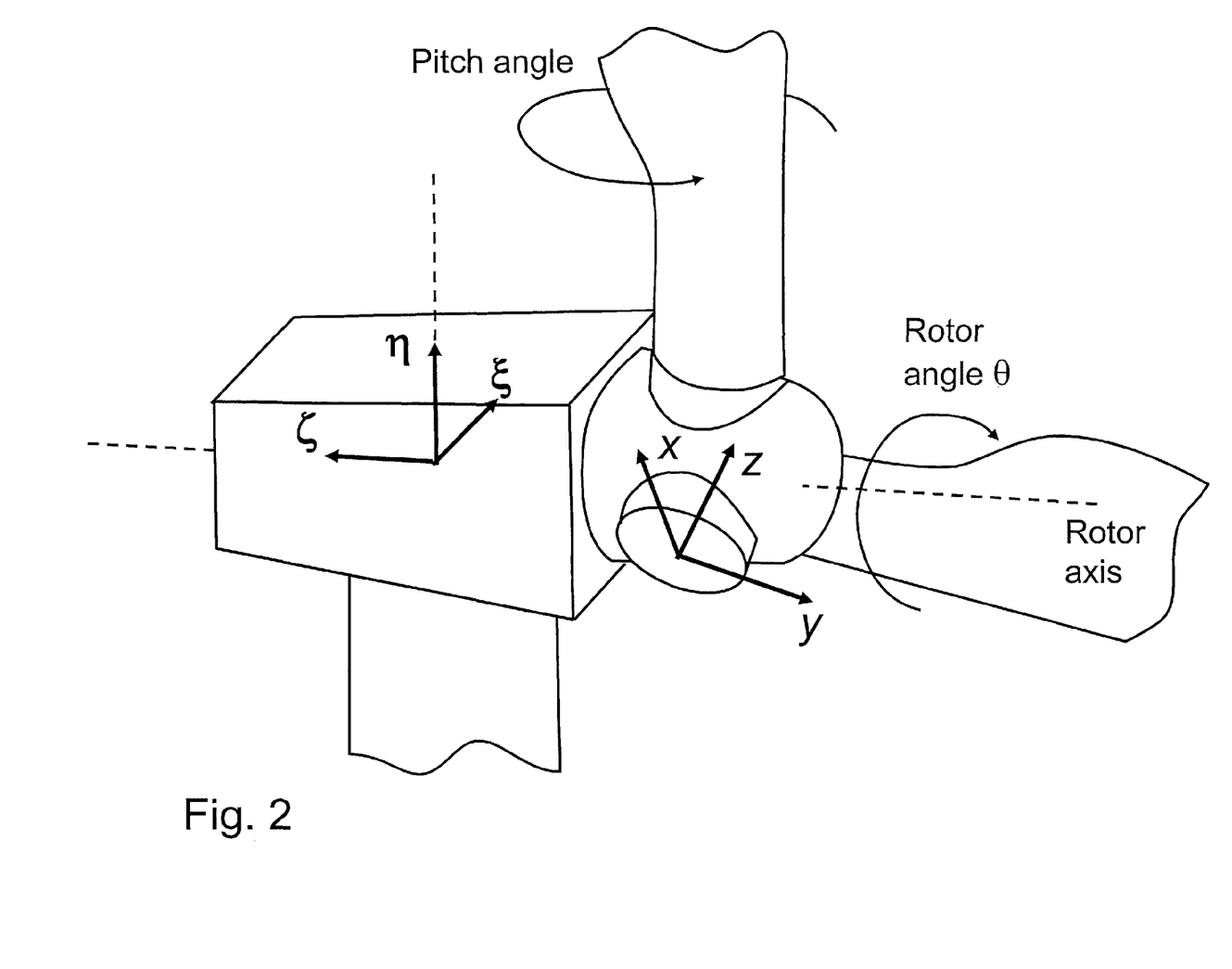
FIG. 2 is an illustration of a rotating, fixed blade coordinate system.

To aid in the description of sensor-signals, we introduce a rotating, blade-fixed coordinate system, as shown in FIG. 2. The x-direction is the direction of the axis of rotation of the rotor, the axis z is parallel to the rotational axis of the pitch bearing, and the direction y completes a right-handed orthogonal coordinate system. (y is parallel to the rotation axis.)

Simple Embodiment of the Invention

Figure 3:
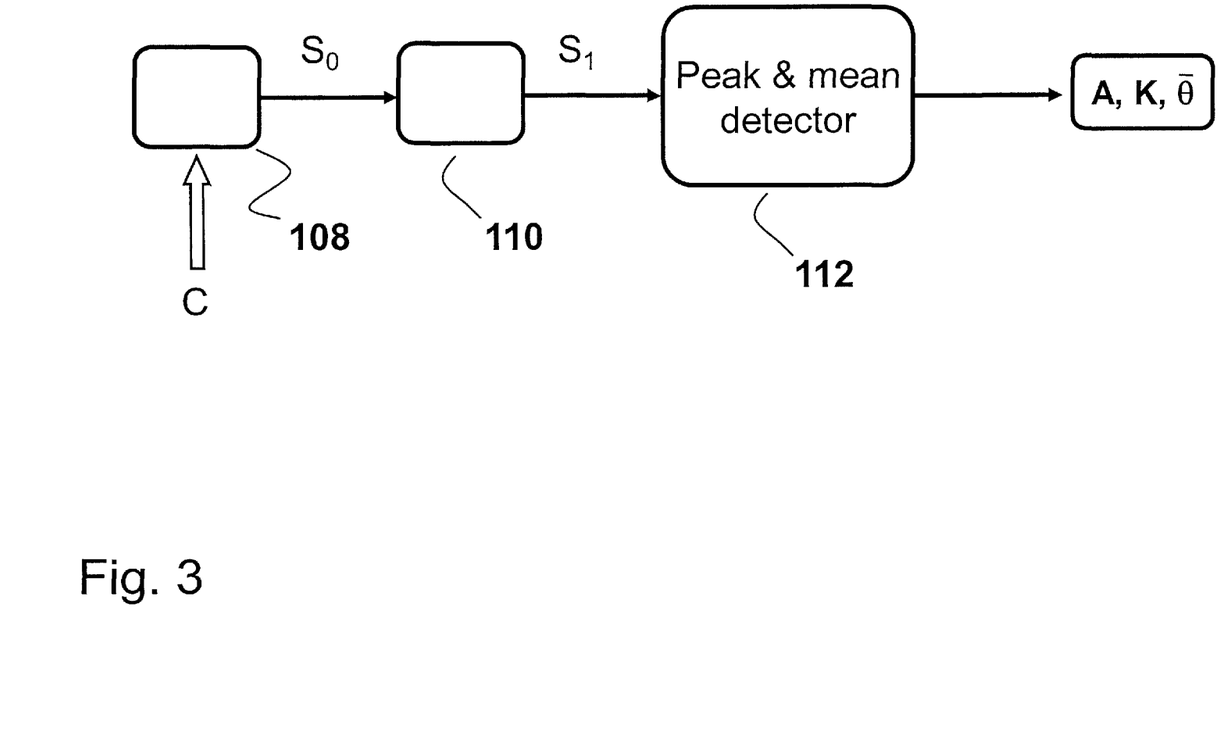
FIG. 3 is a diagram of components of the wind turbine that are used to generate a calibrated sensor signal indicative of at least one wind velocity field characteristic acting on the rotor of the wind turbine.

With reference to FIG. 3, let $S_0$ denote a sensor-signal from a sensor 108 located on the rotor hub or blades, whereby the sensor-signal S is responsive to at least one wind velocity field characteristic, denoted by C. The sensor-signal S is passed through a calibrating means 110 that provides a variable gain and offset to the sensor-signal so that the sensor-signal is essentially calibrated at all times, thereby yielding a balanced-sensor-signal $S_1$. If noise is present in the sensor-signal, a low-pass filter can be incorporated in the calibrating means to attenuate or remove this noise.

In the presence of miss-alignment between the rotor axis and the wind direction, or in the presence of wind shear, the rotation of the rotor (by an angle θ) produces a cyclic variation in the sensor-signal $S_1$ superimposed on a constant value. Let A denote the amplitude of the cyclic variation, let $\overline{\theta}$ denote the angle θ at which a maximum occurs, and let K denote the constant value in the sensor-signal $S_1$. The values of A, K and $\overline{\theta}$, in combination, fully characterize the sensor-signal $S_1$.

A table associating sensor values A, K and $\overline{\theta}$ with wind velocity field characteristic value C is built by recording C values versus $\{A, K, \overline{\theta}\}$ tripplet values as the wind turbine is run under varying wind conditions. This running can be done through an accurate wind-turbine aeroelastic simulation code, or, alternatively, by running the wind-turbine in the field in combination with independent measuring means for establishing the wind velocity field characteristic C.

Figure 4:
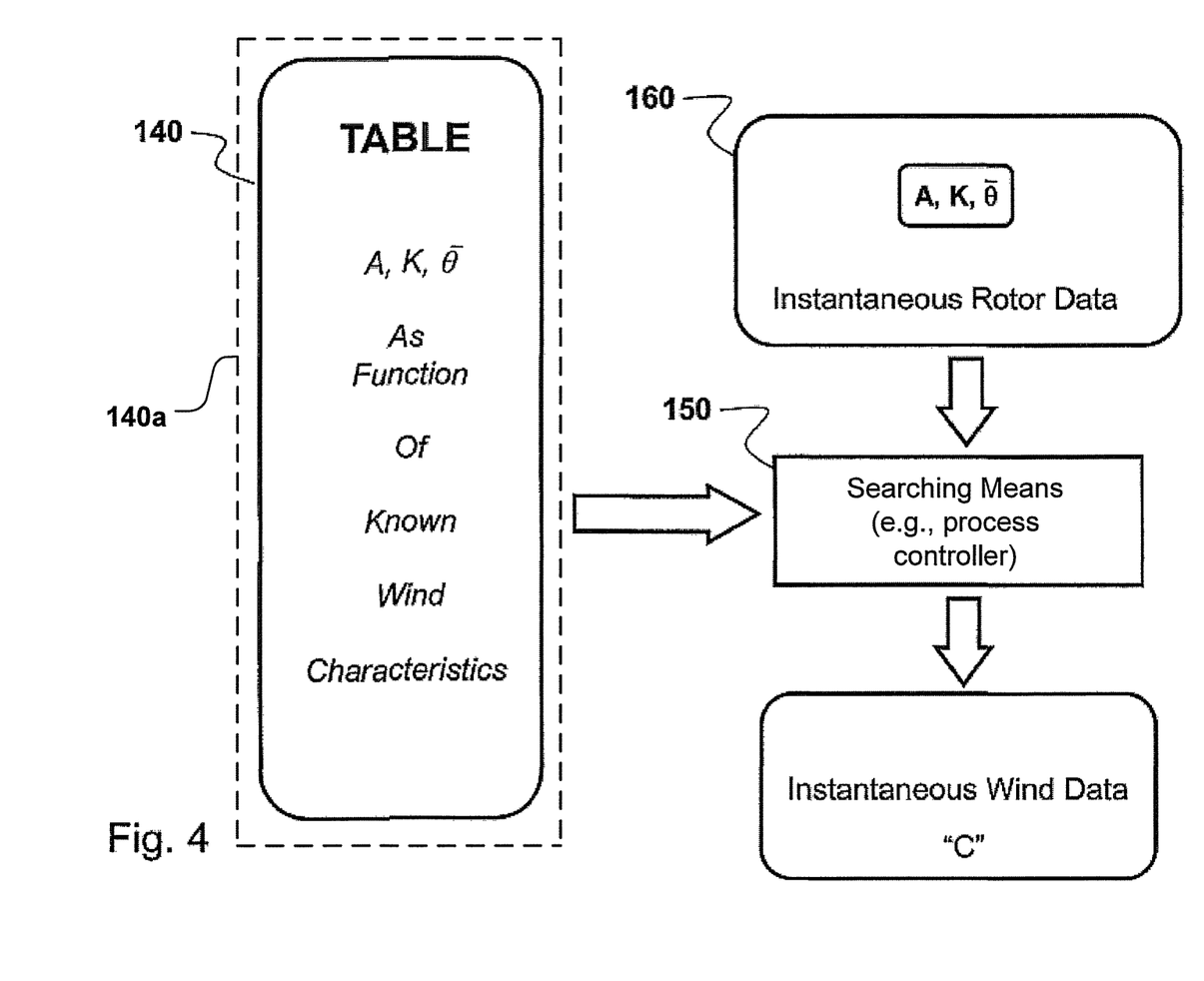
FIG. 4 is a complete table of the run-time values of A, K and $^-\theta$ that are made available to a searching means for associating the run-time values of A, K and $^-\theta$ with a value of the wind field characteristic C.

During normal turbine operation, the run-time values of A, K and $\overline{\theta}$ are obtained from the sensor-signal $S_1$. With reference to FIG. 4, the run-time values of A, K and $\overline{\theta}$, shown at 160, and a memory 140a which stores the complete table 140, is made available to a searching means 150 (e.g., process controller) for associating the run-time values of A, K and $\overline{\theta}$ with a value of the wind field characteristic C. This association is made by locating the stored values of $A_0$, $K_0$ and $\overline{\theta}_0$ that most closely match the corresponding run-time values A, K and $\overline{\theta}$. The value of wind field characteristic $C_0$ associated in the table with $A_0$, $K_0$ and $\overline{\theta}_0$, is the value reported by the wind-field measuring system of this invention, and is taken to represent the wind characteristic value existing at the wind turbine's rotor swept plane, at the instant the association by the searching means 150 is made.

Preferred Embodiment of the Invention

The preferred embodiment of the invention uses a plurality of sensor-signals. The identification of the cyclic and constant components of the signals is now performed by a Multi-Blade-Coordinate (MBC) transformation, or alternatively referred to as Coleman transformation in the literature. This transformation is well known in the art, and can be used when the rotor has three or more blades. We describe the invention for three blades, and extension to four or more blades is a straight-forward procedure to those skilled in the art.

We distinguish between two types of MBC transforms: a standard "1p" MBC that yields the amplitudes of the constant, cosine of θ, and sine of θ components in the signals, and a higher order "2p" MBC that yields the amplitudes of the (constant) cosine of 2θ, and sine of 2θ components in the signals. See, for example, the National Renewable Energy Laboratory publication "Multiblade Coordinate Transformation and its Application to Wind Turbine Analysis" by G. Bir, NREL/CP-500-42553, January 2008. Here, θ is, as above, the angle about the axis of rotation made by the rotor, usually given by the angular position of a tagged blade on the rotor.

Figure 5:
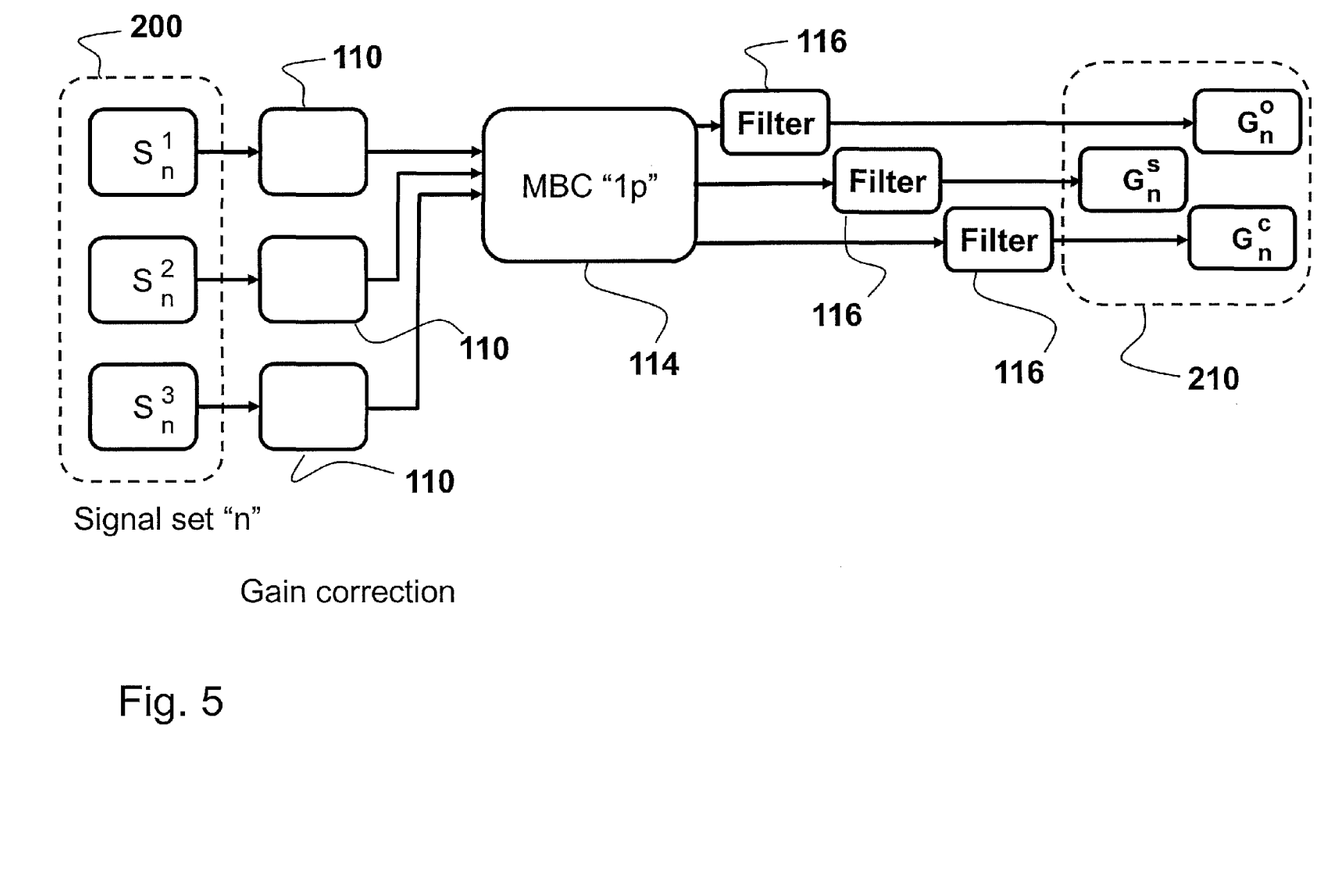
FIG. 5 is a high level block diagram of the components used to form a dealiased-stationary-signal-set built from a predetermined type of sensor data.

With reference to FIG. 5, the basic unit for the "1p" MBC 114 is a signal-set 200 built from three sensor-signals, $\{s_n^1, s_n^2, s_n^3\}$, obtained by measuring the same type of physical quantity on each blade. Here, the superscripts 1, 2, 3 in S denote the blade number associated with the sensor-signal, and n refers to the type of sensor data. In the preferred embodiment, several signal-sets are simultaneously used, as further described below. Each signal-set is processed as follows.

1. Each sensor-signal $S_n^i$ is passed through the dedicated calibrating means 110 which provides a gain and offset, possibly changing in time, to said each sensor-signal.
2. The balanced-signal-set, composed of the balanced-sensor-signals, is passed through a multi-blade-coordinate transformation 114 to yield a stationary-signal-set, consisting of a constant signal, a sine amplitude signal, and a cosine amplitude signal. (This stationary signal set is equivalent to the constant, cyclic amplitude, and angle in the simplified form of the invention).
3. Aliasing errors are removed by passing each component signal of the stationary-signal-set through a low-pass filter 116. The low-pass filter 116 has a corner frequency set below three times the rotor frequency of revolution. The combination of the three low-passed filtered signals forms the dealiased-stationary-signal-set 210, which we label $G_n^1, G_n^2, G_n^3$. One dealiased-stationary-signal-set 210 exists for each signal-set 200 build from a predetermined type of sensor data.

In general, any number of signal-sets can be used in the wind measuring system of this invention, provided that each signal-set is "linearly independent from the others", using nomenclature well known in the field of mathematics. That is, each signal-set is not proportional to the sum of the other signal-set, each multiplied by a fixed scalar value.

In one embodiment of the invention three signal-sets are used, consisting of the blade-root bending moments in the x and y blade-fixed directions, and the blade twisting moment in the z (blade-fixed) coordinate. The standard "1p" MBC is used. The wind velocity field characteristics chosen for the table are the mean speed, $V_m$, the wind direction in the horizontal plane, X, and the first moments in ξ and ζ (x and y), namely $\psi_1$ and $\phi_1$, respectively, also known as the horizontal and vertical wind shear. The table then associates the nine individual values composing the three dealiased-stationary-signal-sets with the four wind velocity field characteristics.

Figure 6:
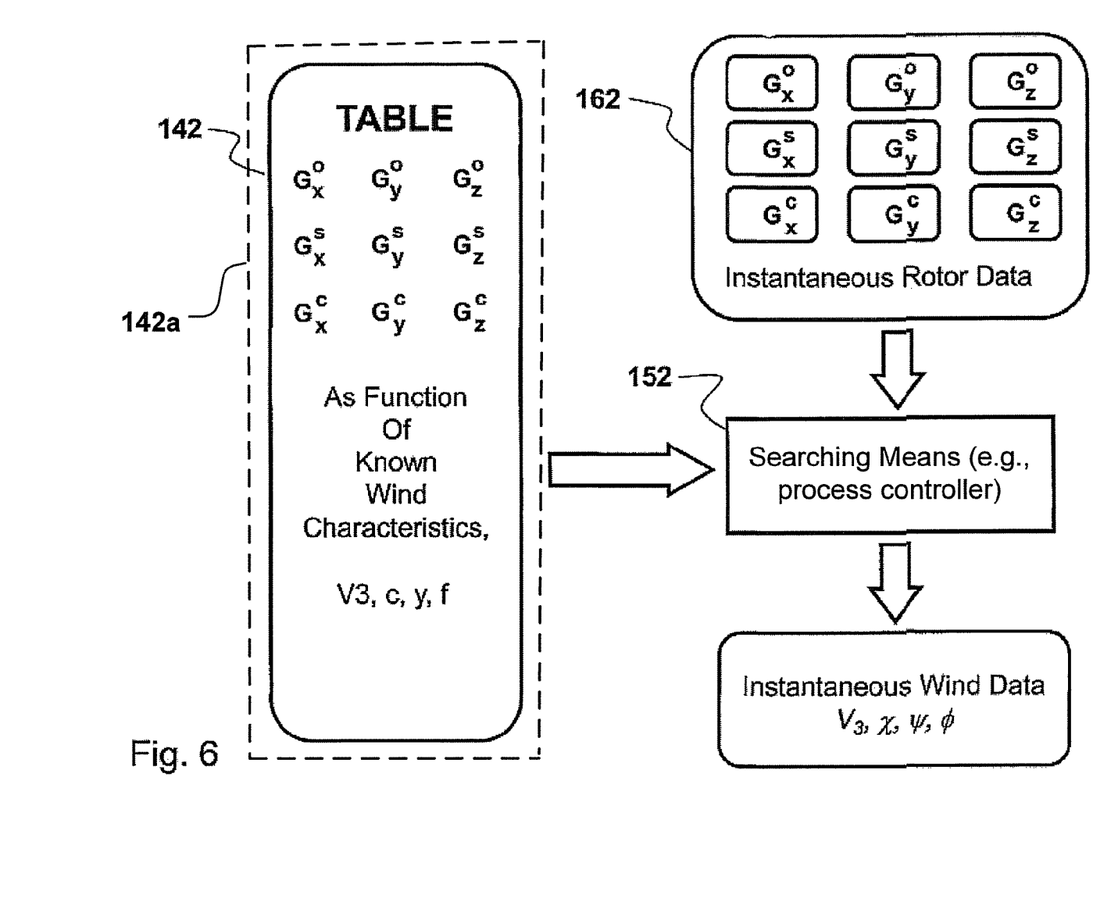
FIG. 6 illustrates a table associating the dealiased-stationary-signal-set values, for each signal type n=x, y and z, and run-time dealiased-stationary-signals-sets, that are made available to a searching means for associating the run-time values of the dealiased-stationary-sensor-signals-sets with the wind velocity field characteristics.

With reference to FIG. 6, a table 142 associating the dealiased-stationary-signal-set values $\{G_n^o, G_n^s, G_n^c\}$, for each signal type n=x, y and z, to the wind velocity field characteristic values, $V_3$, X, $\psi_1$, and $\phi_1$, is build by recording the wind velocity field characteristic values versus the dealiased-stationary-signal-set values as the wind turbine is run under varying wind conditions. This running can be done through an accurate wind-turbine aeroelastic simulation code, or, alternatively, by running the wind-turbine in the field in combination with independent measuring means for establishing the wind velocity field characteristics.

The word table is herein used to denote the generic step of associating signal-set values to wind velocity field characteristic, and includes, for example, methods based on neural nets, wherein the said association is made by the adjustment of weights within the neural net, as well as similar methods wherein the association process includes a single or repeated applications of functional mappings.

During normal turbine operation, the run-time dealiased-stationary-sensor-signals-sets 162 and the complete table 142 are made available to a searching means 152 for associating the run-time values of the dealiased-stationary-sensor-signals-sets with the wind velocity field characteristics. This association is made by searching the table 142 for values of dealiased-stationary-sensor-signals-sets that most closely match the run-time values, and reporting the wind-velocity field characteristics associated with the tabular values as the wind-velocity field characteristics existing at the moment the run-time dealiased-stationary-sensor-signals-sets 162 are measured.

In one embodiment, the searching means is a process controller which implements a least-squares method using the positive semi-definite error defined as the squares of the difference between tabular and run-time values of the dealiased-stationary-sensor-signals-sets. The minimum is found by a gradient-based search method. This mathematical procedure is well known in the art. In another embodiment, the searching means uses binary division of the domain of dealiased-stationary-sensor-signals-sets values to find a minimum of the error. Other algorithms known in the art for finding minimums of functions can be used.

In another embodiment of the invention, the signal-sets 200 are built using sensor signals measuring blade deflections in the x and y blade-fixed directions, and the blade twist in the z (blade-fixed) coordinate, wherein the measurements are made at a predetermined location along each blade. The standard "1p" MBC is used. The wind velocity field characteristics chosen for the table 142, stored in memory 142a, are the mean speed, $V_m$, the wind direction in the horizontal plane, X, and the first moments in ξ and ζ (x and y), namely $\psi_{and} \emptyset_1$, respectively, also known as the horizontal and vertical wind shear. The table then associates the nine individual values composing the three dealiased-stationary-signal-sets with the four wind velocity field characteristics.

Figure 7:
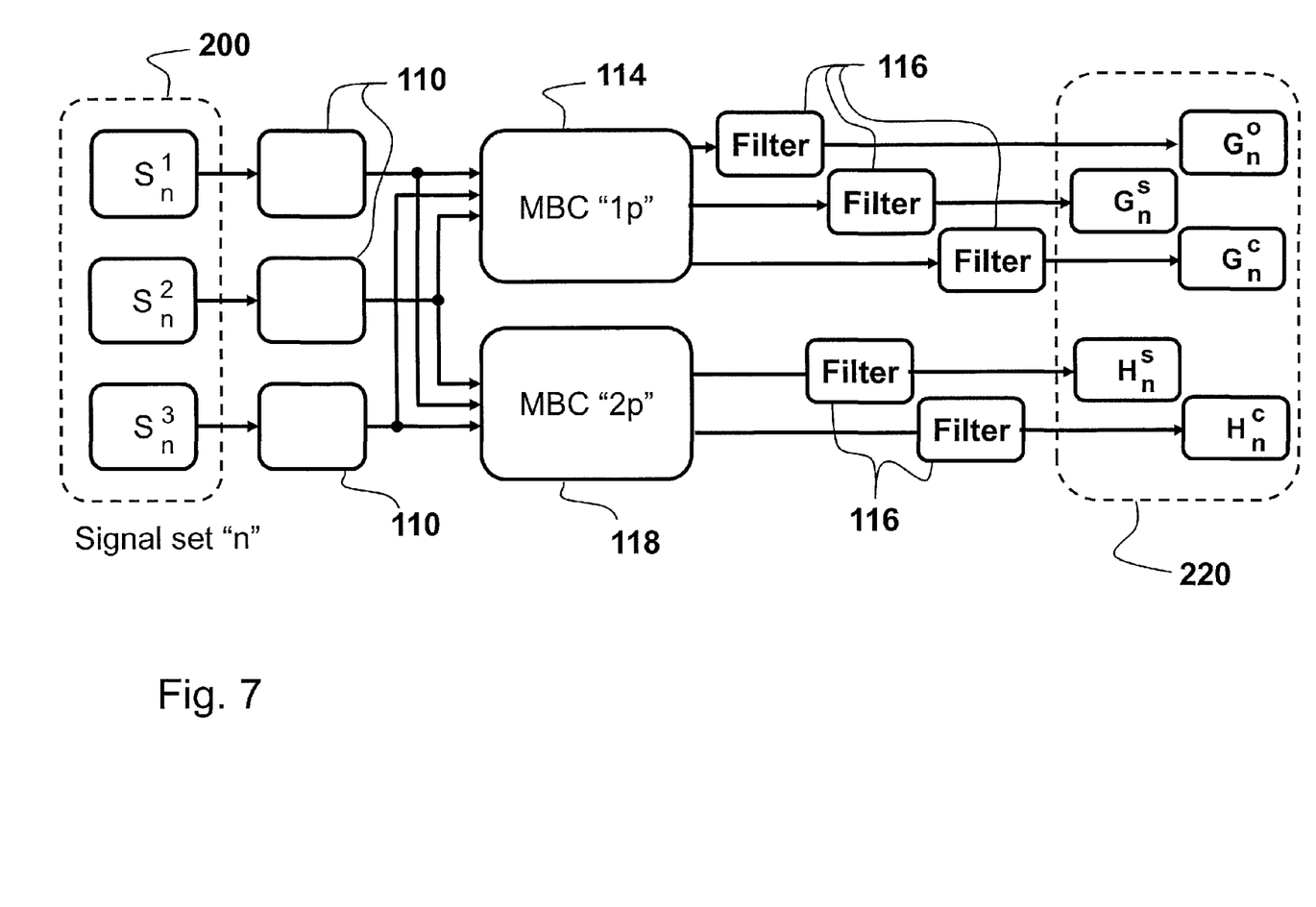
FIG. 7 illustrates, for another embodiment of the invention, processing three signal sets of blade deflections in the x, y and z coordinates to yield a dealiased-stationary-signals-set with five scaler values.

In yet another embodiment of the invention, three signal-sets are used, consisting of blade deflections in the x, y and z (blade-fixed) coordinates, measured at a pre-determined location along each blade. In the processing of each of these signal sets, the signal-set data 200, shown in FIG. 7, is passed through both the standard "1p" MPC 114 and the higher-order "2p" MBC 118, to yield a dealiased-stationary-sensor-signals-set 220 with 5 scalar values, namely $\{G_n^o, G_n^s, G_n^c\}$ from the "1p" MBC, and two additional values $H_n^s, H_n^c$. Since three signal sets are used, there are a total of 15 scalar values provided for the subsequent input into the table 144, which is stored in memory 144a. These values are:

| | | | | |
|---|---|---|---|---|
| $G_x^o$ | $G_x^s$ | $G_x^c$ | $H_x^s$ | $H_x^c$ |
| $G_y^o$ | $G_y^s$ | $G_y^c$ | $H_y^s$ | $H_y^c$ |
| $G_z^o$ | $G_z^s$ | $G_z^c$ | $H_z^s$ | $H_z^c$ |

The wind velocity field characteristics chosen for the table are the mean speed, $V_m$, the wind direction in the horizontal plane, X, and the first and second moments in x and y, namely $\psi_1, \phi_1, \psi_2$ and $\phi_2$, respectively. The table 144 then associates the fiveteen individual values composing the three dealiased-stationary-signal-sets with the six wind velocity field characteristics.

Figure 8:
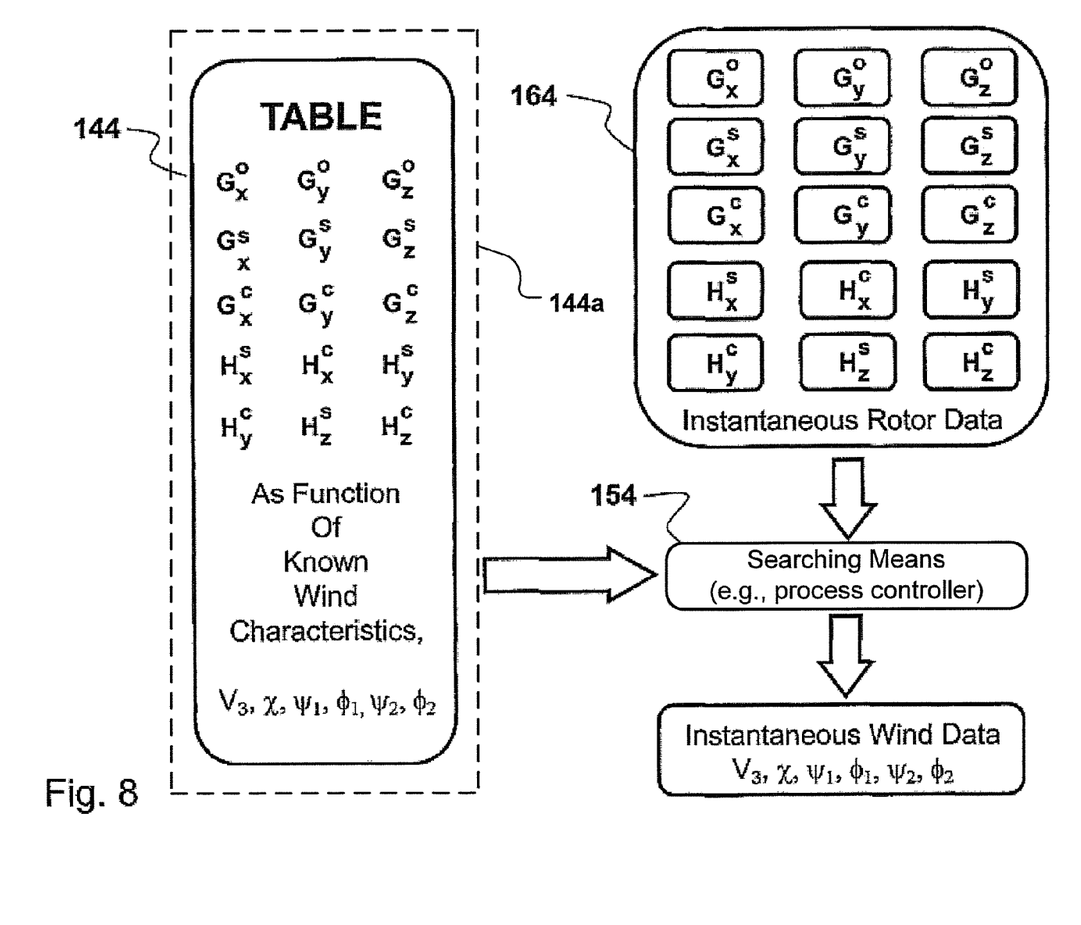
FIG. 8 shows a table of wind velocity field characteristics and a run-time dealiased-stationary-sensor-signals-sets that are made available to a searching means for associating the run-time values of the dealiased-stationary-sensor-signals-sets with the wind velocity field characteristics, and reporting wind-velocity field characteristics associated with tabular values as the wind velocity field characteristics existing at the moment the run-time dealiased-stationary-sensor-signals-sets are measured.

During normal turbine operation, the run-time dealiased-stationary-sensor-signals-sets 164 and the complete table 144 are made available to a searching means 154 (e.g., process controller) for associating the run-time values of the dealiased-stationary-sensor-signals-sets with the wind velocity field characteristics. This association is made by searching the table 144 for values of dealiased-stationary-sensor-signals-sets that most closely match the run-time values, and reporting the wind-velocity field characteristics associated with the tabular values as the wind-velocity field characteristics existing at the moment the run-time dealiased-stationary-sensor-signals-sets 164 are measured.

We note that other wind-velocity-field characteristics can be chosen, such as, for example, all three velocity components instead of the normal wind component $V_3$ and wind direction in the horizontal plane X. The best choice depends on the strategy employed for overall turbine control. We also note that the system herein described can be used jointly with methods to determine wind characteristics based on solutions to governing equations for part or all the wind turbine—in particular in a joint use wherein part of the wind characteristics are determined by solutions to governing equations, and part of the wind characteristics are determined with the system taught herein.

The invention claimed is:

1. A process control system with a wind-velocity-field measurement for use in a wind turbine having a rotor with a plurality of blades, the process control system comprising:
   a memory storing a wind-velocity-field data set including an array of wind-velocity-field characteristics associated with an array of known blade parameters;
   a sensor operable to generate a run-time signal representing a run-time parameter of at least one blade of the plurality of blades, for a wind condition; and
   a process controller operable to (i) access the run-time parameter generated by the sensor and the wind-velocity-field data set, (ii) compute a run-time wind-velocity-field parameter as a function of the run-time parameter and the wind-velocity-field data set, and (iii) generate a wind turbine control signal as a function of the run-time wind-velocity-field parameter for the wind condition.

2. The process control system of claim 1, wherein the run-time parameter represents a physical quantity of at least one of a blade strain and a blade deflection, and wherein the physical quantity is measured at a predetermined location on the at least one blade.

3. The process control system of claim 1, wherein the wind-velocity-field parameter comprises at least one of wind speed, wind direction, linear wind shear in a horizontal plane and linear wind shear in a vertical plane.

4. The process control system of claim 1, further comprising a sensor associated with each of the plurality of blades, each said sensor operable to generate a run-time blade signal representing a run-time blade parameter for each of the plurality of blades, the process controller operable to compute the run-time wind-velocity-field parameter from the run-time blade parameters for the plurality of blades using a multi-blade coordinate transformation.

5. The process control system of claim 4, wherein the process controller is operable to compute the run-time wind-velocity-field parameter having a constant value portion and a cyclical value portion for each sensor.

6. The process control system of claim 4, further comprising a filter operable to remove aliasing errors in the run-time blade parameters.

7. The process control system of claim 1, further comprising:
   a first sensor associated with each of the plurality of blades, each said first sensor operable to generate a first run-time signal representing a first run-time blade parameter for each of the plurality of blades, the process controller operable to compute a first run-time wind-velocity-field parameter from the first run-time blade parameters for the plurality of blades using a first multi-blade coordinate transformation;

a second sensor associated with each of the plurality of blades, each said second sensor operable to generate a second run-time blade signal representing a second run-time blade parameter for each of the plurality of blades which is different than the first run-time blade parameter, the process controller operable to compute a second run-time wind-velocity-field parameter from the second run-time blade parameters for the plurality of blades using a second multi-blade coordinate transformation; and wherein the process controller is operable to compute the run-time wind-velocity-field parameter from the first and second run-time blade parameters.

8. The process control system of claim 7, further comprising a first filter operable to remove aliasing errors in the first run-time blade parameter, and a second filter operable to remove aliasing errors in the second run-time parameter.

9. The process control system of claim in claim 8, wherein at least one of the filters is a low-pass filter with a filter corner frequency below three times a rotation frequency of the rotor.

10. The process control system of claim 1, further comprising a calibration module operable to provide at least one of a calibration gain and a calibration offset to the run-time signal for calibrating the sensor.

11. The process control system of claim 10, wherein the calibration module provides a variable gain to the run-time signal for calibrating the sensor.

12. A wind turbine system including the process control system of claim 1, and further comprising a wind turbine having a rotor with at least two blades.

13. The wind turbine system of claim 12, wherein the process controller is operable to adjust an operating state of the wind turbine in response to the wind turbine control signal.

14. A method of generating a control signal for use in a wind turbine having a rotor with two or more blades, comprising:

generating a run-time signal with a sensor measuring a blade parameter on at least one blade of a wind turbine, the blade parameter being indicative of at least one wind-velocity-field characteristic for a wind condition;

storing a wind-velocity-field data set in a memory, the wind-velocity-field data set including an array of wind-velocity-field characteristic associated with an array of known blade parameters;

accessing the run-time signal generated by the sensor and the wind-velocity-field data set;

computing a run-time wind-velocity-field parameter as a function of the run-time signal; and generating a wind turbine control signal as a function of the run-time wind-velocity-field parameter for the wind condition.

15. A computer readable storage medium, storing instruction executable by a process controller, for performing the method of claim 14.

16. The method of claim 14, further comprising computing the run-time wind-velocity-field parameter having a constant value portion and a cyclical value portion for each sensor.

17. A computer readable storage medium, storing instruction executable by a process controller, for performing the method of claim 16.

* * * * *